(12) United States Patent
Kameyama et al.

(10) Patent No.: US 10,072,842 B2
(45) Date of Patent: Sep. 11, 2018

(54) WATER HEATER

(71) Applicant: NORITZ CORPORATION, Hyogo (JP)

(72) Inventors: Shuji Kameyama, Himeji (JP); Yasutaka Kuriyama, Kakogawa (JP); Norihide Wada, Akashi (JP); Keigo Fukunishi, Akashi (JP); Tatsuya Karaki, Kako-gun (JP)

(73) Assignee: NORITZ CORPORATION, Hyogo (JP)

( * ) Notice: Subject to any disclaimer, the term of this patent is extended or adjusted under 35 U.S.C. 154(b) by 468 days.

(21) Appl. No.: 14/619,663

(22) Filed: Feb. 11, 2015

(65) Prior Publication Data
US 2015/0241086 A1 Aug. 27, 2015

(30) Foreign Application Priority Data

Feb. 21, 2014 (JP) .................. 2014-031857

(51) Int. Cl.
*F24H 1/14* (2006.01)
*F23L 17/00* (2006.01)
(Continued)

(52) U.S. Cl.
CPC .......... *F23L 17/005* (2013.01); *F04D 29/282* (2013.01); *F04D 29/30* (2013.01);
(Continued)

(58) Field of Classification Search
CPC ........... F24H 1/145; F24H 8/00; F23L 17/005
(Continued)

(56) References Cited

U.S. PATENT DOCUMENTS 5,538,395 A 7/1996 Hager
5,775,878 A * 7/1998 Maumus .................. F01D 5/04
416/186 R
(Continued)

FOREIGN PATENT DOCUMENTS

EP 1 479 917 A1 11/2004
JP 58-069742 5/1983
(Continued)

OTHER PUBLICATIONS

An Office Action issued by the Japanese Patent Office dated Oct. 27, 2015, which corresponds to Japanese Application No. 2014-031857 and is related to U.S. Appl. No. 14/619,663; with English language partial translation.

(Continued)

*Primary Examiner* — Alissa Tompkins
*Assistant Examiner* — John Bargero
(74) *Attorney, Agent, or Firm* — Studebaker & Brackett PC

(57) ABSTRACT

A water heater capable of cooling a fan by inflow of air while suppressing backflow of combustion gas is provided. A fan includes: a fan case having a back surface wall; an impeller having a first blade and a second blade and housed in the fan case; a drive source rotating the impeller; and a rotation shaft coupling the impeller and the drive source through a through hole provided in the back surface wall. A gap through which air outside the fan case is suctioned into the fan case is provided between the rotation shaft and the back surface wall. The second blade faces the back surface wall without another member interposed therebetween throughout a range from an inner circumferential side to an outer circumferential side of the second plane.

20 Claims, 12 Drawing Sheets

(51) Int. Cl.
*F24H 8/00* (2006.01)
*F24H 9/20* (2006.01)
*F04D 29/28* (2006.01)
*F04D 29/30* (2006.01)

(52) U.S. Cl.
CPC ............. *F24H 8/00* (2013.01); *F24H 9/2042* (2013.01); *Y02B 30/102* (2013.01)

(58) Field of Classification Search
USPC ........................................................ 122/18.4
See application file for complete search history.

(56) References Cited

U.S. PATENT DOCUMENTS

| | | | | |
|---|---|---|---|---|
| 6,662,758 | B1 * | 12/2003 | Shin | ............... F24H 8/00 122/18.1 |
| 6,805,531 | B2 * | 10/2004 | Iida | ............ B29C 45/0062 415/206 |
| 2012/0121409 | A1 * | 5/2012 | Liu | ............... F04D 17/16 415/215.1 |
| 2012/0141261 | A1 * | 6/2012 | Giovannetti | ......... F04D 29/023 415/203 |

FOREIGN PATENT DOCUMENTS

| | | |
|---|---|---|
| JP | S60-186627 A | 9/1985 |
| JP | H08-100798 A | 4/1996 |
| JP | 2005-023897 A | 1/2005 |
| JP | 2009-091935 A | 4/2009 |
| WO | WO 2009023884 A2 * | 2/2009 ........... B29B 13/065 |

OTHER PUBLICATIONS

An Office Action issued by the Japanese Patent Office dated Oct. 27, 2015, which corresponds to Japanese Patent Application No. 2013-267353 and is related to U.S. Appl. No. 14/619,663; with English language partial translation.

* cited by examiner (a)

(b)

(c)

(d)

WATER HEATER

BACKGROUND OF THE INVENTION

Field of the Invention

The present invention relates to a water heater, and particularly to a water heater of an exhaust suction and combustion type.

Description of the Background Art

In replacement of an already placed tank water heater with an instantaneous water heater, there are locations where an already placed exhaust pipe (a B vent) cannot be removed from a point of view of maintaining appearance of buildings.

At such a location, a water heater can be replaced by leaving the already placed exhaust pipe and inserting an exhaust tube (a flexible exhaust tube) in the exhaust pipe. The exhaust tube should be smaller in diameter, because the exhaust tube cannot be placed in the exhaust pipe if the exhaust tube has a large outer diameter. In order to maintain a stable combustion state even when the exhaust tube is decreased in diameter, an exhaust suction and combustion system should be adopted for a water heater.

A water heater of this exhaust suction and combustion type is disclosed, for example, in Japanese Patent Laying-Open No. 60-186627. In the water heater described in this publication, a heat exchanger for recovering sensible heat, a heat exchanger for recovering latent heat, and a fan are arranged in this order on a downstream side in a flow of a combustion gas produced in a burner. Namely, in the water heater of this type, the fan is arranged downstream of the heat exchanger in the flow of the combustion gas.

As described above, the fan of the water heater of an exhaust suction type is located in a passage of combustion gas, and therefore, exposed to a particularly high temperature environment as compared with a water heater of a forced exhaust type. Accordingly, it is particularly desirable to cool a fan in the water heater of an exhaust suction type. For example, Japanese Patent Laying-Open No. 08-100798 discloses a motor driven fan, wherein a fan casing is provided with an air flow passage through which outside air flows thereinto. According to this motor driven fan, air flows through the air flow passage into the fan casing, so that the motor located in the vicinity of the air flow passage is cooled.

In the case where the air flow passage as mentioned above is provided in the water heater of an exhaust suction and combustion type, however, the combustion gas within the fan casing may flow out of the air flow passage when the pressure inside the fan casing is increased due to factors such as blockage of an exhaust tube and the like. Such an abrupt change in the flow of combustion gas (backflow) causes instability in the suctioning capability of the fan, thereby leading to occurrence of oscillating combustion.

SUMMARY OF THE INVENTION

The present invention has been made in light of the above-described problems. An object of the present invention is to provide a water heater of an exhaust suction and combustion type that allows a motor to be cooled by inflow of air while suppressing backflow of combustion gas.

A water heater according to the present invention includes: a burner generating combustion gas; a heat exchanger heating water flowing through inside by heat exchange with combustion gas; and a fan suctioning combustion gas having passed through the heat exchanger and emitting combustion gas to outside of the water heater. The fan includes a fan case having a back surface wall, an impeller housed within the fan case, a drive source, and a rotation shaft. The impeller has a main plate disposed on one side of the back surface wall of the fan case, a first blade provided on a first plane of the main plate on a side opposite to the back surface wall, and a second blade provided on a second plane of the main plate on a side close to the back surface wall. The drive source serves to rotate the impeller and is disposed on the other side of the back surface wall. The rotation shaft couples the impeller and the drive source through a through hole provided in the back surface wall. A gap through which air outside the fan case is suctioned into the fan case is provided between the rotation shaft penetrating the through hole and the back surface wall. Within the fan case, the second blade faces the back surface wall without another member interposed therebetween throughout a range from an inner circumferential side to an outer circumferential side of the second plane.

According to the water heater of the present invention, since the back surface wall of the fan case faces the second blade throughout a range from the inner circumferential side to the outer circumferential side of the second plane without another member interposed therebetween, the air-blowing capability of the second blade, that is, the capability to blow air from the inner circumferential side toward the outer circumferential side of the second plane, is exerted on the entire space between the back surface wall and the second plane. Furthermore, the space on which the air-blowing capability of the second blade is exerted is in communication with the gap between the rotation shaft and the back surface wall. This allows the outside air to be suctioned through the gap between the rotation shaft and the fan case to emit the air from the inner circumferential side to the outer circumferential side of the second plane. Accordingly, even when the pressure within the fan case is increased, resistance pressure can be maintained in the space between the back surface wall and the second plane so as to resist the flow of the combustion gas that is to flow from the outer circumferential side toward the inner circumferential side of the second plane. Therefore, according to the water heater of the present invention, the fan can be cooled by inflow of air while suppressing backflow of the combustion gas.

Furthermore, a water heater of the present invention includes: a burner generating combustion gas; a heat exchanger heating water flowing through inside by heat exchange with combustion gas; and a fan suctioning combustion gas having passed through the heat exchanger and emitting combustion gas to outside of the water heater. The fan includes a fan case having a back surface wall, an impeller housed within the fan case, a drive source, and a rotation shaft. The impeller has a main plate disposed on one side of the back surface wall of the fan case, a first blade provided on a first plane of the main plate on a side opposite to the back surface wall, a second blade provided on a second plane of the main plate on a side close to the back surface wall, and a second plane side shroud covering at least a part of the second blade. The drive source serves to rotate the impeller and is disposed on the other side of the back surface wall. The rotation shaft couples the impeller housed in the fan case and the drive source through a through hole provided in the back surface wall. A gap through which air outside the fan case is suctioned into the fan case is provided between the rotation shaft penetrating the through hole and the back surface wall. In the impeller, an outer circumferential end of the second blade is located closer to the outer circumferential side of the second plane than an outer circumferential end of the second plane side shroud is.

According to the water heater of the present invention, the impeller is disposed such that the second blade is located on the side close to the back surface wall of the fan case, and the outer circumferential end of this second blade is located closer to the outer circumferential side of the second plane than the outer circumferential end of the second plane side shroud is. Accordingly, the air-blowing capability of the second blade, that is, the capability to blow air from the inner circumferential side toward the outer circumferential side of the second plane, is exerted on the entire space between the back surface wall and the second plane. Furthermore, the space on which the air-blowing capability of the second blade is exerted is in communication with the gap between the rotation shaft and the back surface wall. This allows the outside air to be suctioned through the gap between the rotation shaft and the fan case to emit the air from the inner circumferential side to the outer circumferential side of the second plane. Accordingly, even when the pressure within the fan case is increased, the resistance pressure can be maintained in the space between the back surface wall and the second plane so as to resist the flow of the combustion gas that is to go from the outer circumferential side to the inner circumferential side of the second plane. Therefore, according to the water heater of the present invention, the fan can be cooled by inflow of air while suppressing backflow of the combustion gas.

In the above-described water heater, the impeller has a first plane side shroud covering the first blade. Accordingly, the air-blowing capability of the first blade is improved.

In the water heater described above, the first blade includes a plurality of first blade members each extending from an inner circumferential side to an outer circumferential side of the first plane and formed so as to protrude from the first plane; and the second blade includes a plurality of second blade members each extending from the inner circumferential side to the outer circumferential side of the second plane and formed so as to protrude from the second plane. The second blade members each extending from the inner circumferential side to the outer circumferential side of the second plane are identical in length to the first blade members each extending from the inner circumferential side to the outer circumferential side of the first plane. Accordingly, backflow of the combustion gas can be suppressed more effectively.

According to the water heater described above, a height of each second blade member in a direction in which the second blade member protrudes from the second plane is equal to or less than a height of each first blade member in a direction in which the first blade member protrudes from the first plane. Thereby, as compared with the flow rate of the combustion gas suctioned into the fan case by the air-blowing capability of the first blade, the flow rate of the air suctioned into the fan case by the air-blowing capability of the second blade can be suppressed. Therefore, the above-described water heater is excellent in balance between the capability to suction combustion gas and the cooling performance.

In the water heater described above, when the main plate is seen from an axial direction of the rotation shaft, each second blade member is located between two first blade members adjacent to each other. This allows suppression of resonance between the noise generated by rotation of the first blade and the noise generated by rotation of the second blade, so that the noise generated by the fan can be reduced.

In the water heater described above, the first blade includes: a linearly protruding region that is linearly increased in height from the outer circumferential side to the inner circumferential side; and a curvedly protruding region that is curvedly increased in height from the outer circumferential side to the inner circumferential side, the height extending in a direction in which each first blade member protrudes from the first plane. The curvedly protruding region is located closer to the inner circumferential side than the linearly protruding region is. Accordingly, the air-blowing capability of the first blade is improved.

In the water heater described above, when the first plane is seen from an axial direction of the rotation shaft, each first blade member includes a linearly extending region extending linearly from the outer circumferential side to the inner circumferential side of the first plane, and a curvedly extending region extending curvedly from the outer circumferential side to the inner circumferential side of the first plane. The curvedly extending region is located closer to the inner circumferential side of the first plane than the linearly extending region is. Accordingly, the air-blowing capability of the first blade is improved.

The above-described water heater is a water heater of a latent heat recovery type capable of heating water by recovering latent heat of combustion gas, and the impeller is made of a resin material having acid resistance. Thereby, deterioration of the fan due to drainage water produced by recovery of latent heat is suppressed.

As described above, the present invention can implement a water heater capable of cooling a fan by inflow of gas while suppressing backflow of the gas.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
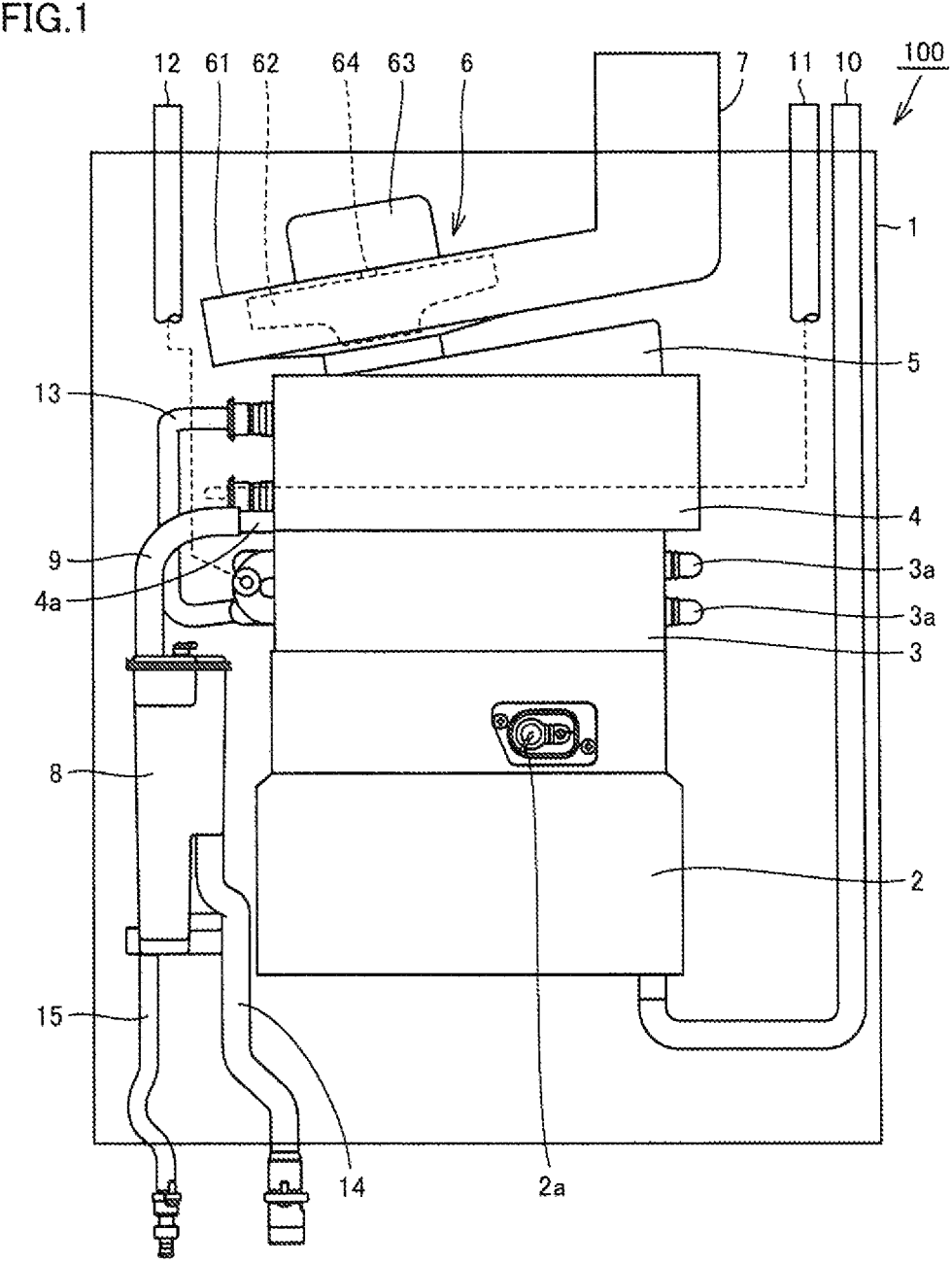
FIG. 1 is a front view schematically showing the configuration of a water heater in one embodiment of the present invention.

The embodiments of the present invention will be hereinafter described with reference to the accompanying drawings.

First Embodiment

<Configuration>

The configuration of a water heater in one embodiment of the present invention will be hereinafter described with reference to FIGS. 1 to 9. In each figure, the same components are designated by the same reference characters, and description thereof will not be repeated.

Figure 2:
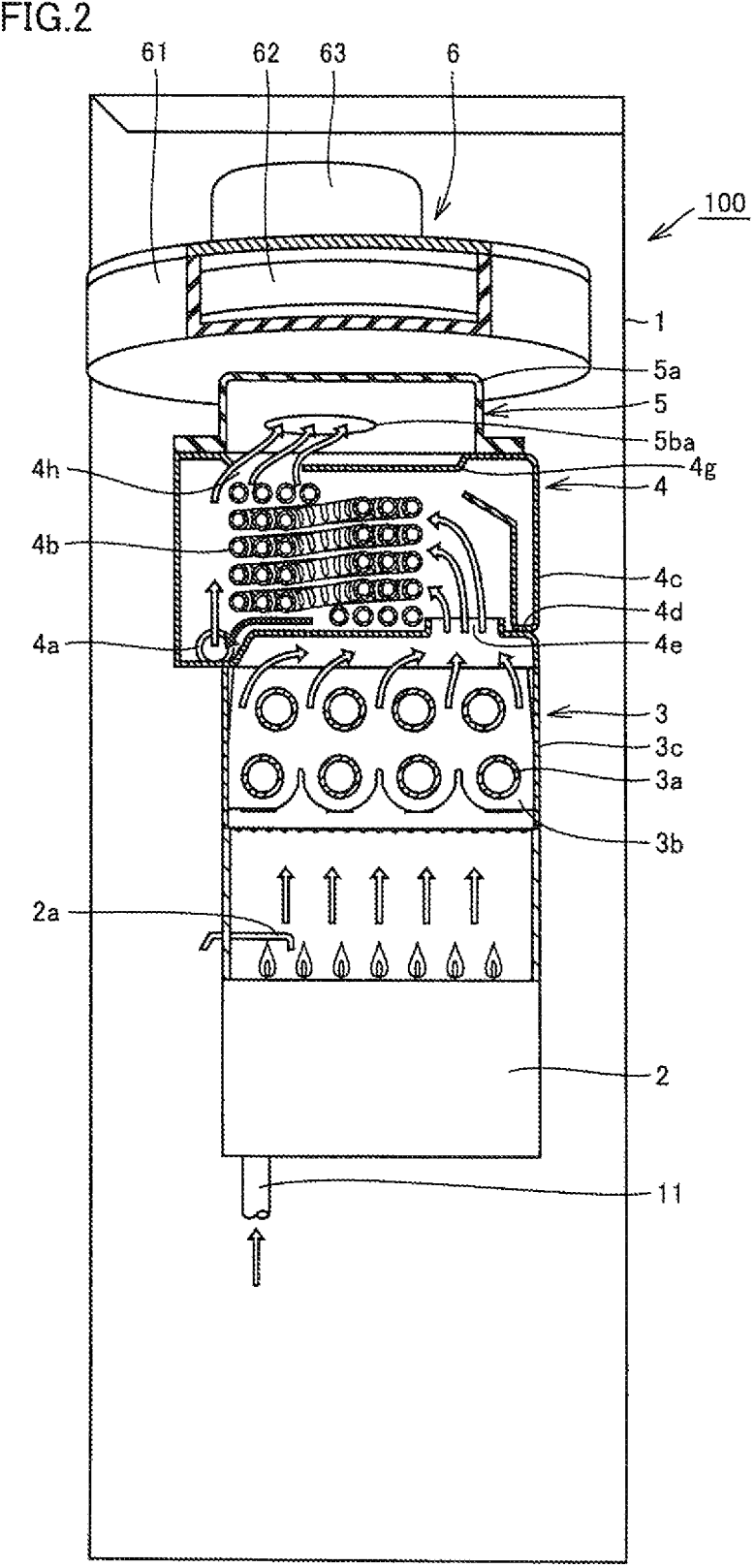
FIG. 2 is a partial cross-sectional side view schematically showing the configuration of the water heater shown in FIG. 1.

Referring mainly to FIGS. 1 and 2, a water heater 100 of the present embodiment serves as a water heater of a latent heat recovery type adapted to an exhaust suction and combustion system. This water heater 100 mainly includes a housing 1, a burner 2, a primary heat exchanger 3, a secondary heat exchanger 4, an exhaust box 5, a fan 6, an exhaust tube 7, a drainage water tank 8, and pipes 9 to 15.

(Burner)

Burner 2 serves to produce a combustion gas by burning a fuel gas. A gas supply pipe 10 is connected to burner 2. This gas supply pipe 10 serves to supply a fuel gas to burner 2. A gas valve (not shown) implemented, for example, by an electromagnetic valve is attached to this gas supply pipe 10.

A spark plug 2*a* is arranged above burner 2. This spark plug 2*a* serves to ignite an air fuel mixture injected from burner 2 to thereby produce a flame, by generating sparks between the plug and a target (not shown) provided in burner 2. Burner 2 generates a quantity of heat by burning a fuel gas supplied from gas supply pipe 10 (which is called a combustion operation).

(Heat Exchanger)

Referring mainly to FIG. 2, primary heat exchanger 3 is a heat exchanger of a sensible heat recovery type. This primary heat exchanger 3 mainly has a plurality of plate-shaped fins 3*b*, a heat conduction pipe 3*a* penetrating the plurality of plate-shaped fins 3*b*, and a case 3*c* accommodating fins 3*b* and heat conduction pipe 3*a*. Primary heat exchanger 3 exchanges heat with the combustion gas generated by burner 2, and specifically, serves to heat water which flows through heat conduction pipe 3*a* of primary heat exchanger 3 with the quantity of heat generated as a result of the combustion operation of burner 2.

Referring mainly to FIG. 2, secondary heat exchanger 4 is a heat exchanger of a latent heat recovery type. This secondary heat exchanger 4 is located downstream of primary heat exchanger 3 in a flow of the combustion gas and connected in series with primary heat exchanger 3. Since water heater 100 according to the present embodiment thus has secondary heat exchanger 4 of a latent heat recovery type, it is a water heater of the latent heat recovery type.

Secondary heat exchanger 4 mainly has a drainage water discharge port 4*a*, a heat conduction pipe 4*b*, a sidewall 4*c*, a bottom wall 4*d*, and an upper wall 4*g*. Heat conduction pipe 4*b* is layered as it is spirally wound. Sidewall 4*c*, bottom wall 4*d*, and upper wall 4*g* are arranged to surround heat conduction pipe 4*b*.

In secondary heat exchanger 4, water flowing through heat conduction pipe 4*b* is pre-heated (heated) through heat exchange with the combustion gas of which heat has been exchanged in primary heat exchanger 3. As a temperature of the combustion gas is lowered to approximately 60° C. through this process, moisture contained in the combustion gas is condensed so that latent heat can be obtained. In addition, latent heat is recovered in secondary heat exchanger 4 and moisture contained in the combustion gas is condensed, thereby producing drainage water.

Bottom wall 4*d* serves as a partition between primary heat exchanger 3 and secondary heat exchanger 4, and also serves as an upper wall of primary heat exchanger 3. This bottom wall 4*d* is provided with an opening 4*e* that allows communication between a space where heat conduction pipe 3*a* of primary heat exchanger 3 is arranged and a space where heat conduction pipe 4*b* of secondary heat exchanger 4 is arranged. As shown with hollow arrows in FIG. 2, the combustion gas can flow from primary heat exchanger 3 to secondary heat exchanger 4 through opening 4*e*. In this embodiment, for the sake of simplification, although one common component is employed for bottom wall 4*d* of secondary heat exchanger 4 and the upper wall of primary heat exchanger 3, an exhaust collection and guide member may be connected between primary heat exchanger 3 and secondary heat exchanger 4.

Furthermore, upper wall 4*g* is provided with an opening 4*h*. This opening 4*h* allows communication between the space where heat conduction pipe 4*b* of secondary heat exchanger 4 is arranged and an internal space in exhaust box 5. As shown with hollow arrows in FIG. 2, the combustion gas can flow from secondary heat exchanger 4 into the internal space in exhaust box 5 through opening 4*h*.

Drainage water discharge port 4*a* is provided in sidewall 4*c* or bottom wall 4*d*. This drainage water discharge port 4*a* opens at a lowest position in the space surrounded by side wall 4*c*, bottom wall 4*d* and upper wall 4*g* (at a lowermost position in a vertical direction in the state where the water heater is placed), which is lower than the lowermost end of heat conduction pipe 4*b*. Thus, drainage water produced in secondary heat exchanger 4 can be guided to drainage water discharge port 4*a* along bottom wall 4*d* and sidewall 4*c* as shown with black arrows in FIG. 2.

(Exhaust Box)

Figure 3:
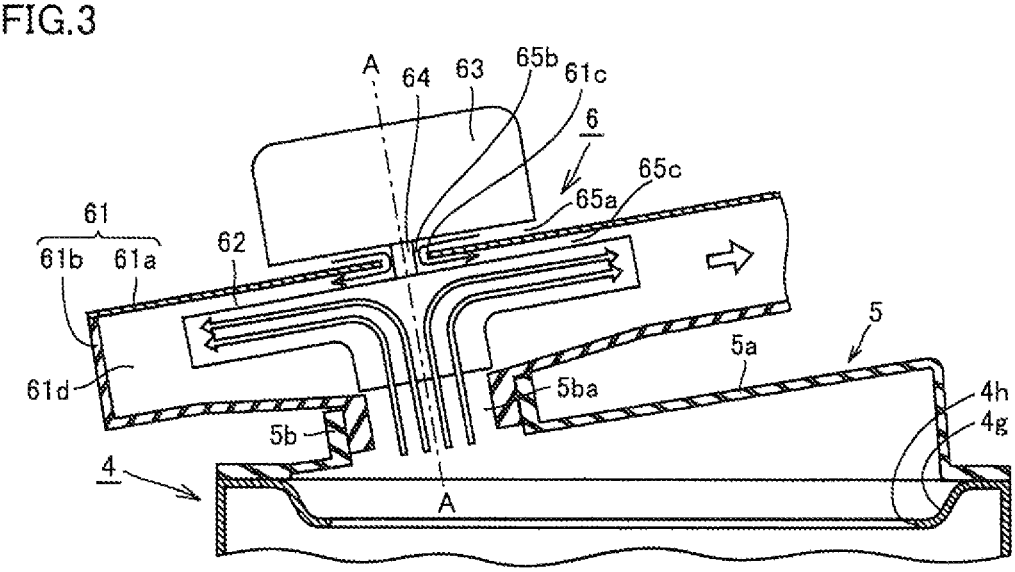
FIG. 3 is a partial cross-sectional view schematically showing a fan and an exhaust box for illustrating the configuration of the fan of the water heater shown in FIG. 1.

Referring mainly to FIGS. 2 and 3, exhaust box 5 forms a path for a flow of the combustion gas between secondary heat exchanger 4 and fan 6. This exhaust box 5 can guide the combustion gas of which heat has been exchanged in secondary heat exchanger 4 to fan 6. Exhaust box 5 is attached to secondary heat exchanger 4 and located downstream of secondary heat exchanger 4 in the flow of the combustion gas.

Exhaust box 5 mainly has a box main body 5*a* and a fan connection portion 5*b*. The internal space of box main body 5*a* communicates through opening 4*h* of secondary heat exchanger 4 with the internal space in which heat conduction pipe 4*b* of secondary heat exchanger 4 is disposed. Fan connection portion 5*b* is provided so as to protrude from the upper portion of box main body 5*a*. This fan connection portion 5*b* has a cylindrical shape, for example, and has an internal space 5*ba* that communicates with the internal space of box main body 5*a*.

(Fan)

Referring mainly to FIGS. 1 and 3, fan 6 mainly has a fan case 61, an impeller 62, a drive source 63, and a rotation shaft 64. Fan 6 serves to emit the combustion gas (of which heat has been exchanged in secondary heat exchanger 4) which has passed through secondary heat exchanger 4 to the outside of water heater 100 by suctioning the combustion gas, and this fan is connected to exhaust tube 7 leading to the outside of water heater 100.

This fan 6 is located downstream of exhaust box 5 and secondary heat exchanger 4 in the flow of the combustion gas. Namely, in water heater 100, burner 2, primary heat exchanger 3, secondary heat exchanger 4, exhaust box 5, and fan 6 are arranged in this order from upstream to downstream in the flow of the combustion gas produced in burner 2. Since the combustion gas is suctioned and exhausted by means of fan 6 as above in this arrangement, water heater 100 in the present embodiment is a water heater of an exhaust suction and combustion type.

(Fan Case)

Mainly referring to FIG. 3, fan case 61 mainly includes a back surface wall 61*a* provided with a through hole 61*c* and a circumferential wall 61*b* surrounding back surface wall 61*a*, and has an internal space 61*d* in which impeller 62 is housed in a rotatable manner. In FIG. 3, although back surface wall 61*a* and circumferential wall 61*b* are formed by different members, back surface wall 61*a* and circumferential wall 61*b* may be integrally formed.

(Impeller)

Referring mainly to FIGS. 3 to 6, impeller 62 is housed within fan case 61 (on one side of back surface wall 61*a*). Impeller 62 mainly has a disc-shaped main plate 62*a*, a first blade 62*b*, a second blade 62*c*, and a first plane side shroud 62*d*. Main plate 62*a* has a first plane 62*aa* and a second plane 62*ab* located on the side opposite to first plane 62*aa*. First blade 62*b* is provided on first plane 62*aa* while second blade 62*c* is provided on second plane 62*ab*. Furthermore, first plane side shroud 62*d* is provided so as to cover the entire first blade 62*b*. First plane side shroud 62*d* is provided in its center portion with an opening 62*dd*.

Figure 6:
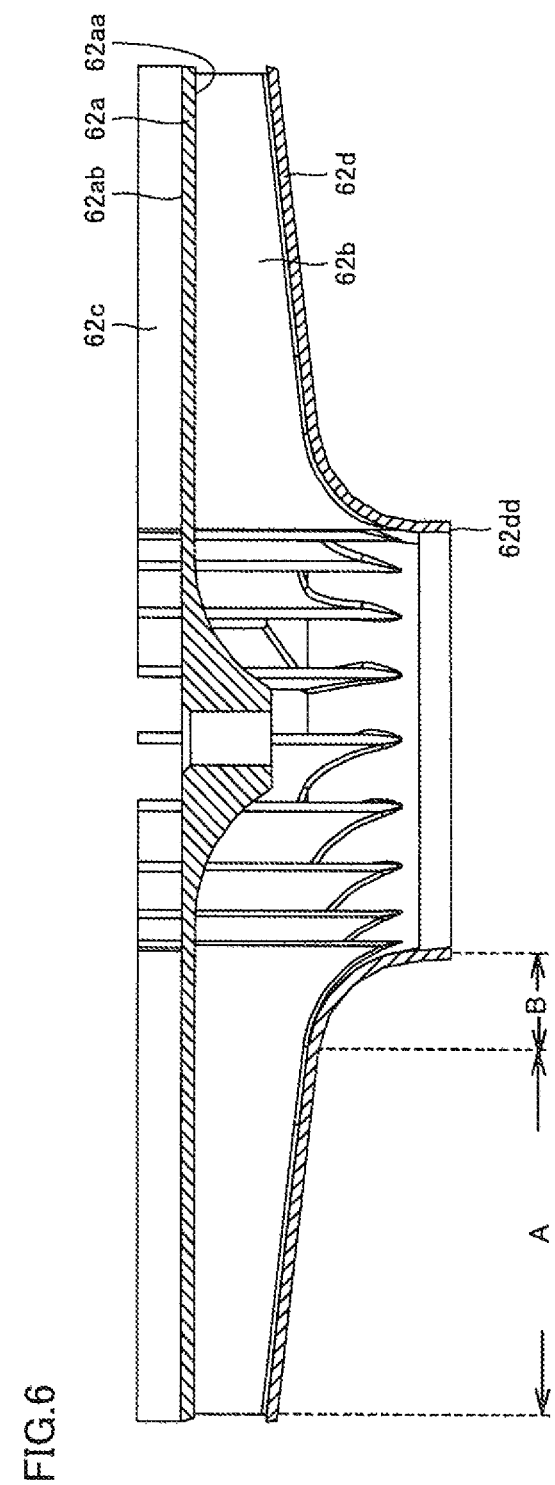
FIG. 6 is a cross-sectional view schematically showing the configuration of the impeller in the water heater shown in FIG. 1.
Figure 7:
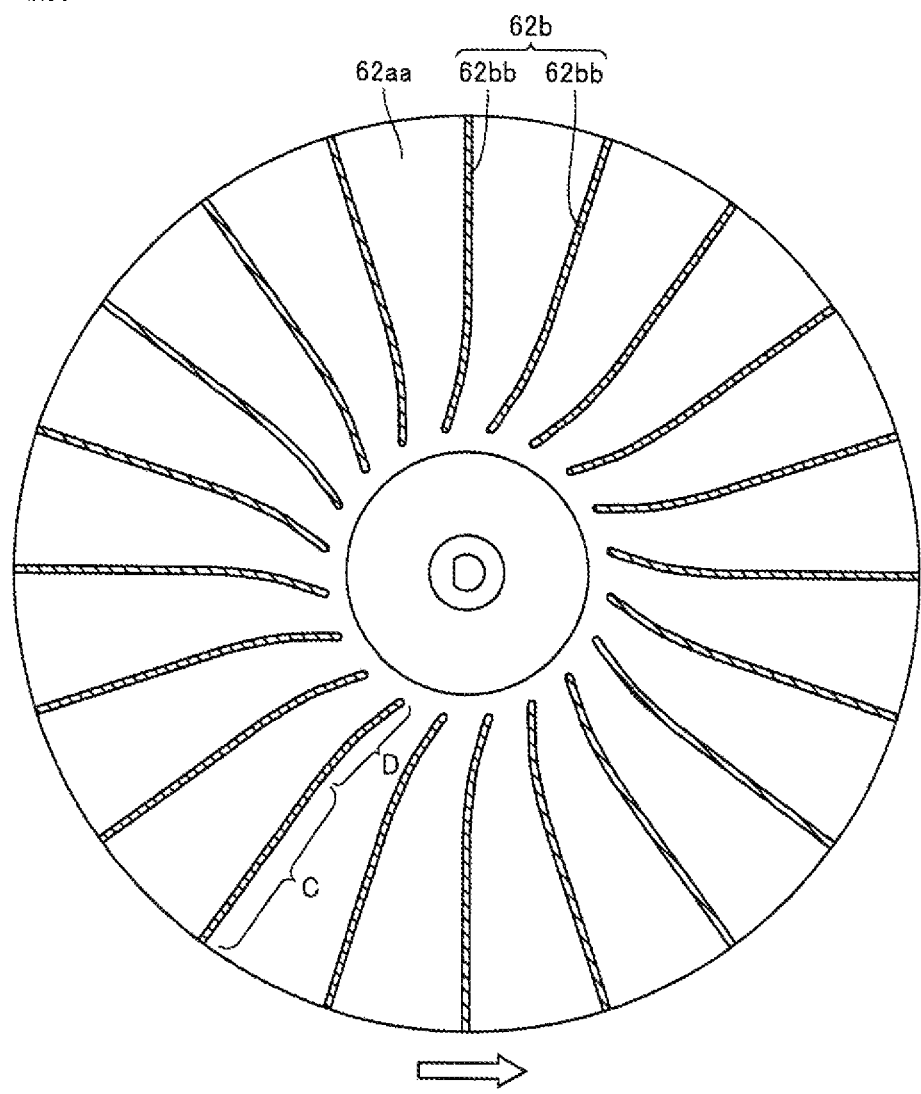
FIG. 7 is an exploded plan view for illustrating the configuration of the first blade included in the impeller of the water heater shown in FIG. 1.

Referring mainly to FIGS. 6 and 7, first blade 62*b* includes a plurality of first blade members 62*bb* each extending from the inner circumferential side to the outer circumferential side of first plane 62*aa* and formed so as to protrude from first plane 62*aa*. First blade members 62*bb* are separately provided on first plane 62*aa* and do not come in contact with each other.

First blade 62*b* includes: a linearly protruding region (a region A in FIG. 6) that is linearly increased in height from the outer circumferential side toward the inner circumferential side; and a curvedly protruding region (a region B in FIG. 6) that is curvedly increased in height from the outer circumferential side toward the inner circumferential side, this height extending in the direction in which first blade member 62*bb* protrudes from first plane 62*aa*. In first plane 62*aa*, the curvedly protruding region is located closer to the inner circumferential side than the linearly protruding region is. Furthermore, when first plane 62*aa* is seen from the axial direction of rotation shaft 64 (an axis A shown by an alternate long and short dash line in FIG. 3), first blade member 62*bb* has: a linearly extending region linearly extending from the outer circumferential side to the inner circumferential side of first plane 62*aa* (a region C in FIG. 7); and a curvedly extending region curvedly extending from the outer circumferential side to the inner circumferential side of first plane 62*aa* (a region D in FIG. 7). The curvedly extending region is located closer to the inner circumferential side than the linearly extending region is.

In the present specification, the distance between both ends of first blade member 62*bb* extending from the inner circumferential side to the outer circumferential side of the main plate (the distance extending along the line appearing where first blade member 62*bb* and first plane 62*aa* come in contact with each other) is defined as a "length" of first blade member 62*bb*. Furthermore, the length of first blade member 62*bb* in the direction in which this first blade member 62*bb* protrudes from first plane 62*aa* (the distance between a position at which first blade member 62*bb* is in contact with first plane 62*aa* and a position of first blade member 62*bb* that is farthest away from first plane 62*aa* in the axial direction of this position) is defined as a "height" of first blade member 62*bb*. The same also applies to second blade member 62*cc*.

With respect to the perpendicular direction of first plane 62*aa*, first blade members 62*bb* have one ends that are in contact with first plane 62*aa* and the other ends that are collectively covered by first plane side shroud 62*d*. In addition, the "shroud" is generally shaped to extend along the height of each blade member to be covered, so as not to interfere with air flowing between the blade members. Therefore, in water heater 100 of the present embodiment, first plane side shroud 62*d* has a truncated cone shape having a slope portion squeezed to a certain extent so as to adapt to the change in the heights of first blade members 62*bb*.

Figure 8:
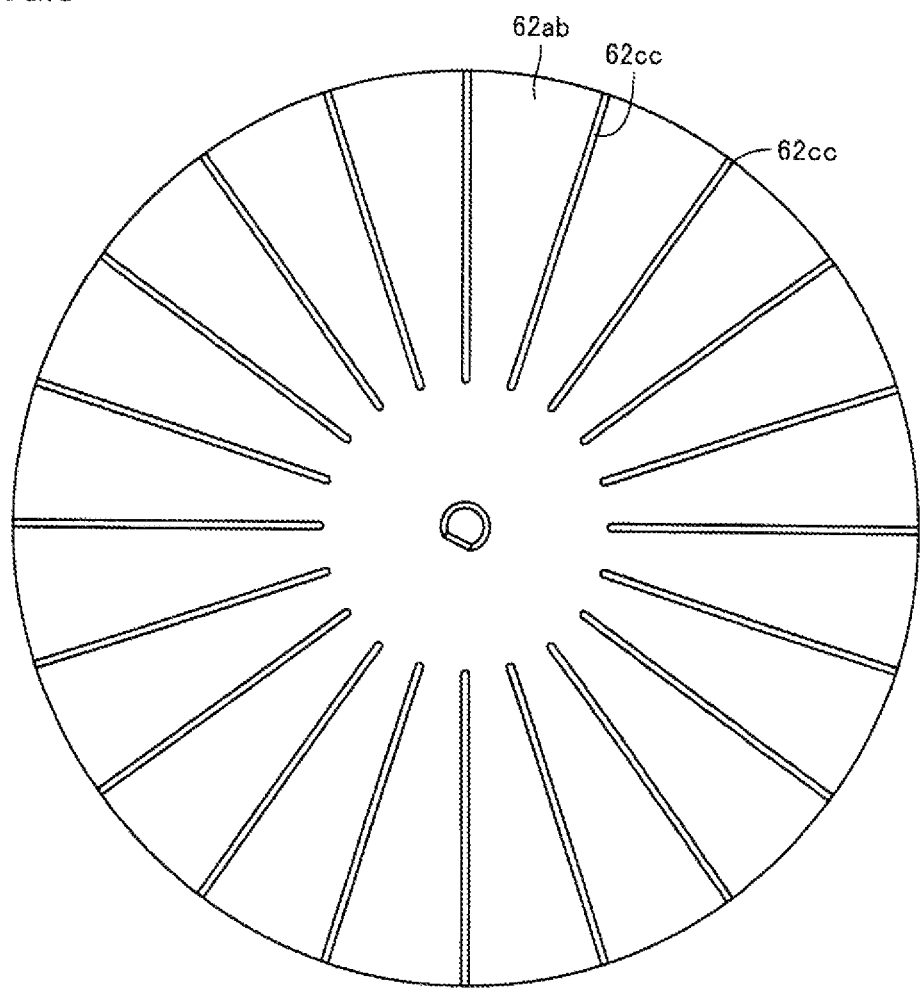
FIG. 8 is a plan view for illustrating the configuration of the second blade included in the impeller of the water heater shown in FIG. 1.

Referring mainly to FIGS. 6 and 8, second blade 62*c* includes a plurality of second blade members 62*cc* each extending from the inner circumferential side to the outer circumferential side of second plane 62*ab* and formed so as to protrude from second plane 62*ab*. Second blade members 62*cc* are separately provided on first plane 62*ab* and not in contact with each other. In water heater 100 of the present embodiment, second blade members 62*cc* are identical in height.

Referring to FIG. 3, impeller 62 is disposed within fan case 61 (on one side of back surface wall 61*a*) such that first plane 62*aa* is located on the fan connection portion 5*b* side that is opposite to back surface wall 61*a*. Furthermore, as shown in FIG. 3, impeller 62 is disposed such that opening 62*dd* of first plane side shroud 62*d* faces internal space 5*ba*.

According to the above-described configuration, by the air-blowing capability of first blade 62*b*, combustion gas can be suctioned from box main body 5*a* of exhaust box 5 through fan connection portion 5*b* into fan case 61, as shown by the hollow arrows in FIG. 3. In other words, in water heater 100 of the present embodiment, by means of rotation of impeller 62, the combustion gas within exhaust box 5 is suctioned from the inner circumferential side of first plane 62*aa* of impeller 62 and emitted to the outer circumferential side thereof.

On the other hand, second plane 62*ab* is arranged so as to be located on the side close to back surface wall 61*a*, and second blade 62*c* on second plane 62*ab* faces back surface wall 61*a* without another member interposed therebetween throughout a range from the inner circumferential side to the outer circumferential side of second plane 62*ab*.

Figure 9:
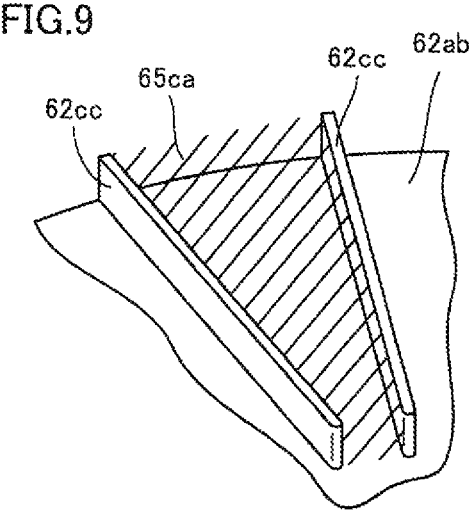
FIG. 9 is a partial perspective view for illustrating a space region between the second blade members.

Referring to FIG. 9, hereinafter described will be the configuration in which second blade 62*c* faces back surface wall 61*a* "throughout a range from the inner circumferential side to the outer circumferential side of second plane 62*ab* without another member interposed therebetween". Referring to FIG. 9, a gap 65*c* between impeller 62 and back surface wall 61a includes a space region 65ca (a region shown by oblique lines in FIG. 9) surrounded by two facing planes of two second blade members 62cc adjacent to each other and second plane 62ab located between these two facing planes.

The state where second blade 62c faces back surface wall 61a "throughout a range from the inner circumferential side to the outer circumferential side of second plane 62ab without another member interposed therebetween" means that the entire area of second plane 62ab from its inner circumferential side to its outer circumferential side in each of the plurality of space regions 65ca can be visible when second plane 62ab is seen in top down view from back surface wall 61a.

Accordingly, the air-blowing capability of second blade 62c is exerted on the entire space (gap 65c) between back surface wall 61a and second plane 62ab. Furthermore, this gap 65c is in communication with gap 65b between rotation shaft 64 and back surface wall 61a. In addition, gap 65b is in communication with gap 65a between drive source 63 and back surface wall 61a.

According to the above-described configuration, by the air-blowing capability of second blade 62c, air can be suctioned from the outside of fan 6 through gap 65b into fan case 61 as shown by black arrows in FIG. 3. In other words, in water heater 100 of the present embodiment, by means of rotation of impeller 62, air outside this fan 6 is suctioned through gap 65b from the inner circumferential side of second plane 62ab of impeller 62 and emitted to the outer circumferential side thereof.

(Drive Source)

Referring mainly to FIGS. 1 and 3, drive source 63 is provided outside fan case 61 (on the other side of back surface wall 61a). In water heater 100 of the present embodiment, gap 65a between drive source 63 and back surface wall 61a is in communication with gap 65b. It is to be noted that gap 65c does not necessarily need to be provided between fan case 61 and drive source 63, but gap 65b only has to be provided so as to be in communication with the outside of fan 6.

Rotation shaft 64 penetrates through hole 61c of fan case 61, thereby coupling impeller 62 housed within fan case 61 and drive source 63 provided outside fan case 61. Accordingly, impeller 62 is provided with drive force from drive source 63 and can rotate around rotation shaft 64.

(Exhaust Tube)

Mainly referring to FIG. 1, exhaust tube 7 is disposed outside water heater 100, and connected to the outer circumferential side of fan case 61. Accordingly, the combustion gas emitted to the outer circumferential side by first blade 62b of impeller 62 can be emitted to the outside of water heater 100 through exhaust tube 7.

(Drainage Water Tank)

Referring mainly to FIG. 1, drainage water tank 8 serves to store drainage water produced in secondary heat exchanger 4. This drainage water tank 8 and drainage water discharge port 4a of secondary heat exchanger 4 are connected by drainage water discharge pipe 9. The acid drainage water stored in drainage water tank 8 is for example temporarily stored in the internal space of drainage water tank 8, and then, usually discharged through a drainage water discharge pipe 14 to the outside of water heater 100.

It is to be noted that the lower portion of drainage water tank 8 is connected to a drainage water outlet pipe 15 separately from drainage water discharge pipe 14. This drainage water outlet pipe 15 (usually closed) is designed to be opened during maintenance or the like, thereby allowing discharge of the drainage water within drainage water tank 8 that cannot be discharged through drainage water discharge pipe 14. An internal space in drainage water tank 8 may be filled with a neutralization agent (not shown) for neutralizing acid drainage water.

(Pipe)

Referring mainly to FIG. 1, a gas supply pipe 10 is connected to burner 2. Water supply pipe 11 is connected to heat conduction pipe 4b of secondary heat exchanger 4 (see FIG. 2) and hot water delivery pipe 12 is connected to heat conduction pipe 3a of primary heat exchanger 3 (see FIG. 2). Heat conduction pipe 3a of primary heat exchanger 3 and heat conduction pipe 4b of secondary heat exchanger 4 are connected to each other through connection pipe 13. Each of gas supply pipe 10, water supply pipe 11, and hot water delivery pipe 12 leads to the outside, for example, in a top portion of water heater 100.

<Effects>

Then, the functions and effects of the water heater in the present embodiment will be hereinafter described.

In water heater 100 of the present embodiment, by the air-blowing capability of first blade 62b, the combustion gas within exhaust box 5 is suctioned from the inner circumferential side of first plane 62aa of impeller 62 and emitted to the outer circumferential side thereof, as described above. Furthermore, in water heater 100 of the present embodiment, by the air-blowing capability of second blade 62c, the air outside the fan 6 is suctioned through gap 65b from the inner circumferential side of second plane 62ab of impeller 62 and emitted to the outer circumferential side thereof.

Furthermore, by the air-blowing capability of second blade 62c, resistance pressure resisting the flow of gas going from the outer circumferential side to the inner circumferential side of second plane 62ab is generated in gap 65c between back surface wall 61a and impeller 62. Therefore, the water heater of the present invention allows the outside air to flow into through the gap 65b between rotation shaft 64 and fan case 61, and also allows resistance pressure to be kept to resist the flow of the combustion gas that is to flow from the inside of the fan case to the outside (backflow). Therefore, according to the water heater of the present invention, the fan can be cooled by inflow of air while suppressing backflow of the combustion gas.

In this case, for example, in the case where impeller 62 does not have second blade 62c, and therefore, gap 65c is merely sandwiched between back surface wall 61a and second plane 62ab of main plate 62a, the air-blowing capability is not exerted on this gap 65c. Accordingly, it is difficult to cause the air outside the fan 6 to flow through gaps 65a to 65c so as to be emitted to the outer circumferential side of second plane 62ab. Furthermore, when the pressure within fan case 61 is increased due to blockage of exhaust tube 7 or the like, the combustion gas suctioned from exhaust box 5 into fan case 61 readily flows through gap 65b to the outside.

Furthermore, in the present embodiment, since water heater 100 of the exhaust suction and combustion type is employed as described above in the present embodiment, a combustion operation by burner 2 can be stabilized as compared with a water heater of what is called a forced exhaust type even though exhaust tube 7 is decreased in diameter, which will be described below.

In a water heater of what is called a forced exhaust type, a fan, a burner, a primary heat exchanger, and a secondary heat exchanger are arranged in this order from upstream to downstream in a flow of a combustion gas. Namely, the combustion gas produced in the burner is caused to flow into an exhaust tube outside the water heater by the fan through the primary heat exchanger and the secondary heat exchanger.

The combustion gas forced out of the fan receives flow path resistance produced by the primary heat exchanger and the secondary heat exchanger before it reaches the exhaust tube. Therefore, a pressure with which the combustion gas is sent immediately before the exhaust tube is lower by magnitude comparable to this flow path resistance. Therefore, in order to force the combustion gas into the exhaust tube smaller in diameter, a fan blow pressure should be raised. When a fan blow pressure is raised, however, an internal pressure within a burner case becomes higher. Therefore, when a supply pressure of the combustion gas supplied to the burner is low, a combustion operation becomes unstable.

In contrast, according to the exhaust suction and combustion system in the present embodiment, burner 2, primary heat exchanger 3, secondary heat exchanger 4, and fan 6 are arranged in this order from upstream to downstream in the flow of the combustion gas. With this system, since a pressure is negative on the upstream side of fan 6, a blow pressure by fan 6 does not have to be raised. Thus, since an internal pressure within the burner case can be maintained low even though exhaust tube 7 is decreased in diameter, a combustion operation can be stabilized even when a supply pressure of the combustion gas supplied to burner 2 is low.

Furthermore, in impeller 62 of water heater 100 in the present embodiment, first blade 62b is covered by first plane side shroud 62d provided with opening 62dd. Accordingly, first blade 62b can be improved in air-blowing capability as compared with the case where first plane side shroud 62d is not provided.

Furthermore, in impeller 62 of water heater 100 in the present embodiment, it is preferable that the height of second blade 62c is equal to or less than 5% of the diameter of main plate 62a. Thereby, since the air-blowing capability of second blade 62c can be appropriately controlled, excessive suction of the outside air can be suppressed. In addition, when air is excessively suctioned, oscillating combustion tends to occur. The height of second blade 62c is more preferably equal to or less than 4% of the diameter of main plate 62a, and further more preferably equal to or less than 2% of the diameter of main plate 62a.

Furthermore, in impeller 62 of water heater 100 in the present embodiment, it is preferable that the distance between second blade 62c and back surface wall 61a is equal to or less than the height of second blade 62c. Thereby, the air-blowing capability obtained by second blade 62c can be sufficiently exerted on the entire gap 65c. This distance is more preferably equal to or less than half of the height of second blade 62c.

Figure 4:
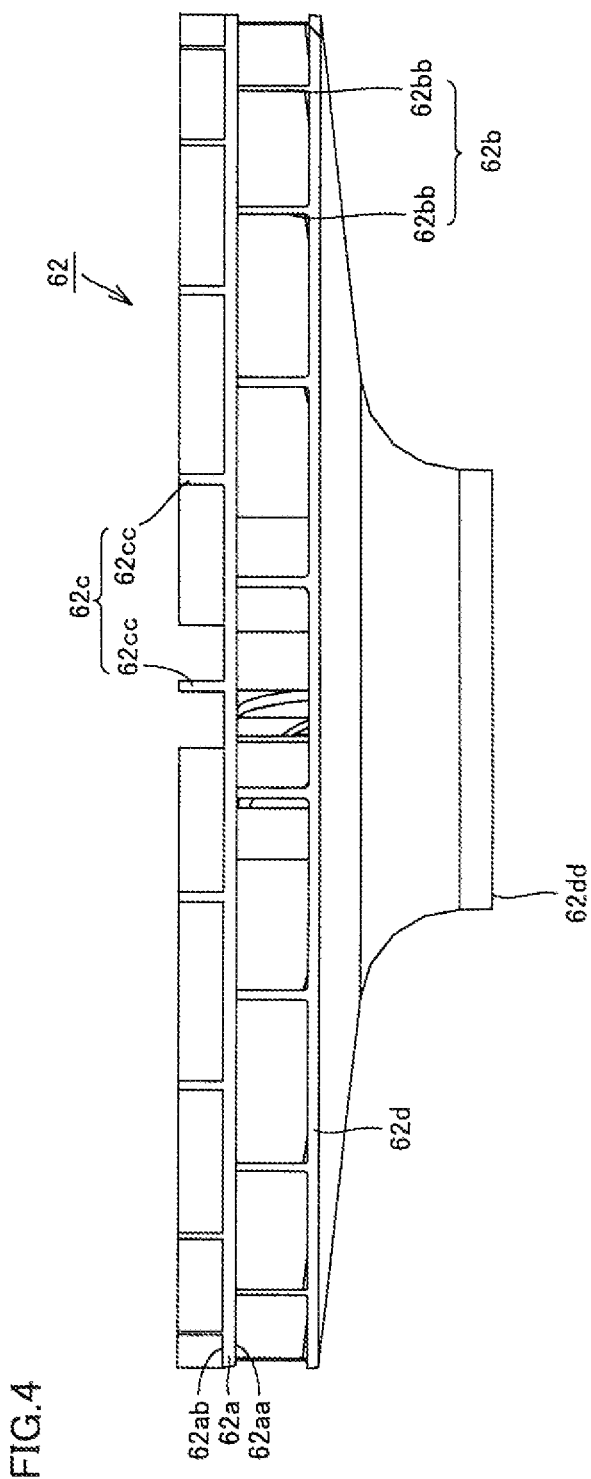
FIG. 4 is a side view schematically showing the configuration of an impeller in the water heater shown in FIG. 1.
Figure 5:
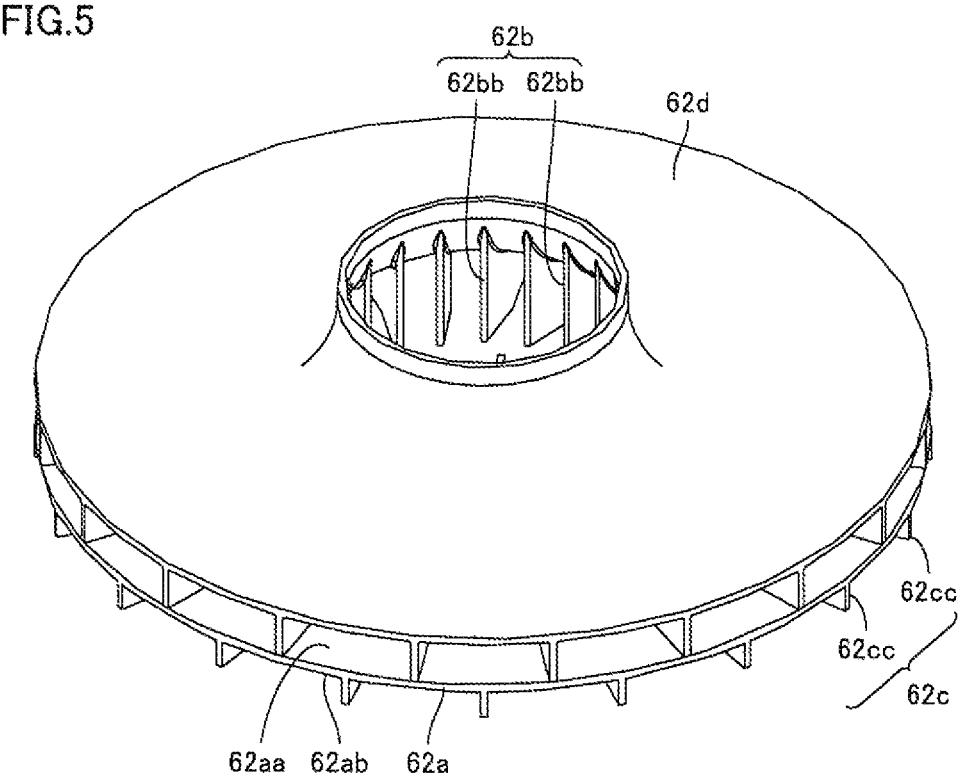
FIG. 5 is a perspective view schematically showing the configuration of the impeller in the water heater shown in FIG. 1.

Furthermore, referring to FIG. 4, in impeller 62 of water heater 100 in the present embodiment, each of second blade members 62cc is located between first blade members 62bb adjacent to each other when main plate 62a is seen from the axial direction. Thereby, it becomes possible to suppress resonance between the noise generated by rotation of first blade 62bb and the noise generated by rotation of second blade 62cc, so that the noise generated by fan 6 can be reduced.

Furthermore, referring to FIGS. 7 and 8, in impeller 62 of water heater 100 in the present embodiment, the number of first blade members 62bb is the same as the number of second blade members 62cc, but the numbers thereof are not limited thereto. For the purpose of achieving uniform air-blowing capability in the circumferential direction of impeller 62, however, it is preferable that the number of second blade members 62cc is a submultiple of the number of first blade members 62bb.

Furthermore, in impeller 62 of water heater 100 in the present embodiment, first blade members 62bb are identical in length to second blade members 62cc. Thereby, in particular, backflow of the combustion gas can be effectively suppressed. The following is the present inventors' view about the reason of this effect.

In the case where first blade members 62bb are identical in length in the radial direction to second blade members 62cc, the resistance pressure of first blade 62b (the pressure resisting the force of the flow from the outer circumferential side toward the inner circumferential side on the first plane 62aa side) is approximately the same as the resistance pressure of second blade 62c (the pressure resisting the force of the flow from the outer circumferential side toward the inner circumferential side on second plane 62ab). This specifically means that the blow pressure of the combustion gas suctioned by first blade 62b is equal to the blow pressure of the air suctioned by second blade 62c. If these blow pressures are well-balanced in this way, even the particularly raised pressure within fan case 61 hardly causes such a situation as that the balance is disturbed on one side to cause backflow to occur only on the second blade 62c side. In addition, although it is particularly preferable that first blade 62b and second blade 62c are identical in length, backflow can be effectively suppressed if the length of first blade 62b is equal to or greater than half of the length of second blade 62c.

Furthermore, in impeller 62 of water heater 100 in the present embodiment, the height of second blade member 62cc is equal to or less than the height of first blade member 62bb. Thereby, the flow rate of the air that is caused to flow into fan case 61 by the air-blowing capability of second blade 62c can be suppressed as compared with the flow rate of the combustion gas that is caused to flow into fan case 61 by the air-blowing capability of first blade 62b. If the air-blowing capability of second blade 62c is excessively enhanced, it is feared that excessively incoming air may affect the flow of combustion gas, which can however be effectively suppressed according to water heater 100 as described above. Therefore, the above-described water heater 100 is excellent in balance between the capability to suction combustion gas and the cooling performance. More preferably, the height of second blade 62c is equal to or less than half of the height of first blade 62b.

In addition, in impeller 62 of water heater 100 in the present embodiment, the heights of second blade members 62cc are identical in a region from the outer circumferential side to the inner circumferential side, but the heights of second blade members 62cc are not limited thereto. For example, for the purpose of allowing the air-blowing capability by second blade 62c to be sufficiently exerted on the entire gap 65c, it is preferable to change the heights of second blade members 62cc so as to adapt to the shape of back surface wall 61a, in order to further reduce the gap between second blade members 62cc and back surface wall 61a.

Figure 10:
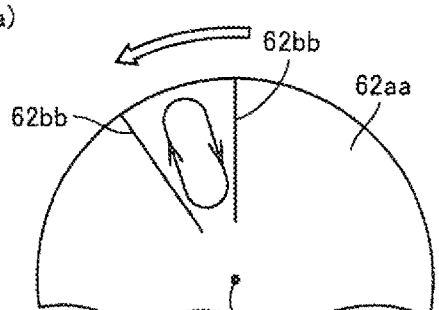
FIGS. 10(*a*) to 10(*d*) each are a schematic diagram for illustrating the flow of gas on the first plane of the impeller.
Figure 10:
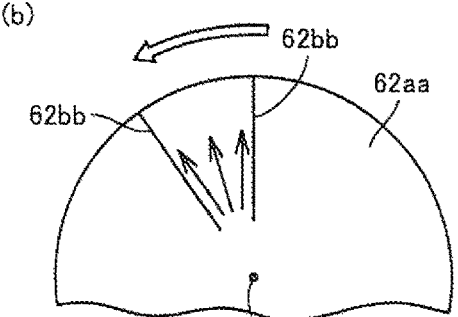
Figure 10:
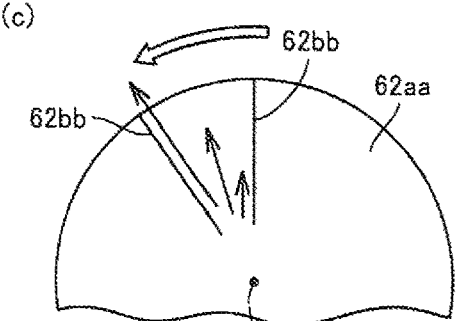
Figure 10:
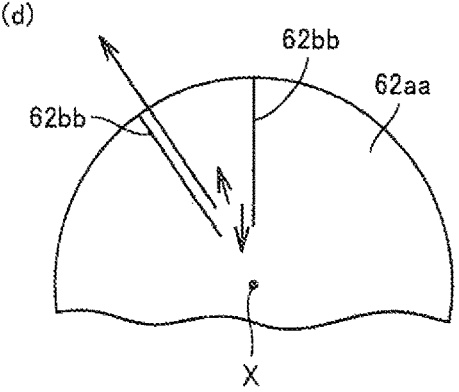

Furthermore, referring to FIG. 6, in impeller 62 of water heater 100 in the present embodiment, first blade member 62bb has a linearly protruding region (a region A in FIG. 6) and a curvedly protruding region (a region B in FIG. 6), so that the air-blowing capability of first blade 62b is improved, the reason of which will be hereinafter described with reference to FIG. 10.

In FIGS. 10(a) to 10(d), a reference character X indicates the center point of first plane 62aa; each hollow arrow schematically shows the rotation direction of main plate 62a; each black arrow schematically shows the direction in which gas flows; and the length of each black arrow schematically shows the magnitude of the flow velocity of gas. Referring to FIGS. 10(a) to 10(d), when the combustion gas is suctioned by impeller 62, the circulation flow shown by each black arrow in FIG. 10(a) and the meridional flow shown by each black arrow in FIG. 10(b) occur on first plane 62aa between first blade members 62bb adjacent to each other. Accordingly, the flow with velocity distribution obtained by combining the circulation flow and the meridional flow is to occur on first plane 62aa.

In this case, when the meridional flow is sufficiently strong relative to the circulation flow, the flow with velocity distribution from the inner circumferential side toward the outer circumferential side of first plane 62aa is generated as shown by the black arrows in FIG. 10(c). Accordingly, first blade 62b can have relatively high air-blowing capability. However, when the meridional flow is weak relative to the circulation flow, the flow with velocity distribution including the flow going from the outer circumferential side to the inner circumferential side of first plane 62aa is generated as shown by the black arrows in FIG. 10(d). In the case of the flow as shown in FIG. 10(d), the air-blowing capability of first blade 62b is deteriorated or becomes unstable.

Referring back to FIG. 6, since first blade member 62bb has region A and region B, the gas flow passage surrounded by first plane 62aa, first blade members 62bb adjacent to each other and first plane side shroud 62d is configured to be the largest on the gas suctioning side (inner circumferential side), and to be narrowed abruptly (curvedly) from the gas suctioning side toward the gas emitting side (outer circumferential side), and thereafter, further linearly narrowed.

According to the configuration of the gas flow passage as described above, since the area of the gas flow passage on the gas suctioning side is sufficiently large, it becomes possible to reduce the resistance that is to be applied to the combustion gas at the time when this combustion gas flows into the gas flow passage. Furthermore, since the area of the gas flow passage is abruptly decreased as coming closer to the outer circumferential side, the flow velocity of the combustion gas that flows through the gas flow passage is abruptly increased. Furthermore, since the region of the gas flow passage that is linearly narrowed continues relatively long, the flow velocity of the combustion gas is more effectively increased, so that the rate of the combustion gas at the time of emission is sufficiently raised as compared with the rate of the combustion gas at the time of inflow.

Therefore, by providing first blade member 62bb with a linearly protruding region and a curvedly protruding region, the rate of the meridional flow produced within the gas flow passage can be sufficiently increased, so that occurrence of backflow resulting from the increased circulation flow can be effectively suppressed. Thereby, the air-blowing capability of first blade 62b is improved and also stabilized, so that the air-blowing capability of the fan is improved.

Furthermore, referring to FIG. 7, in impeller 62 of water heater 100 in the present embodiment, when first plane 62aa is seen from the axial direction, first blade member 62bb has a linearly extending region (a region C in FIG. 7) linearly extending from the outer circumferential side to the inner circumferential side of first plane 62aa, and a curvedly extending region (a region D in FIG. 7) curvedly extending from the outer circumferential side to the inner circumferential side of first plane 62aa. Accordingly, the flow passage between adjacent first blade members 62bb is formed so as to be curved in the rotation direction of main plate 62a on the gas suctioning side (inner circumferential side) and so as to have a linear passage on the gas emitting side (outer circumferential side). It is to be noted that the direction in which the curvedly extending region is curved is the same as the rotation direction of main plate 62a (indicated by a hollow arrow in FIG. 7).

According to the above-described configuration, relative to rotating impeller 62, the inlet port of the flow passage is curved in the rotation direction of impeller 62, thereby allowing the combustion gas to more efficiently flow into the flow passage. Furthermore, on the gas emitting side on which the centrifugal force is more likely to be applied to the combustion gas flowing through the flow passage, the direction of the flow passage and the direction in which the centrifugal force is applied can be oriented in a more similar direction. Accordingly, the combustion gas flowing toward the gas emitting side is more efficiently accelerated by the centrifugal force. Therefore, the air-blowing capability of the fan is consequently improved.

Furthermore, water heater 100 in the present embodiment is a water heater of a latent heat recovery type capable of heating water by recovering latent heat. Also, it is preferable that impeller 62 is made of a resin material having acid resistance. This allows impeller 62 to have resistance to acid drainage water. Furthermore, for the same reason, it is preferable that fan case 61, exhaust box 5, and exhaust tube 7 each are also made of a resin material having acid resistance. Furthermore, impeller 62 may be made of acid-resistant stainless steel.

Examples of the resin material having acid resistance may be polyphenylene sulfide (PPS), syndiotactic polystyrene (SPS), polyvinyl chloride (PVC), phenol resin, epoxy resin, silicone resin, fluororesin such as polytetrafluoroethylene, unsaturated polyester resin, melamine resin, polycarbonate resin, methacrylstyrene (MS) resin, methacryl resin, AS resin (styrene acrylonitrile copolymer), ABS resin (acrylonitrile, butadiene, styrene copolymerization synthetic resin), polyethylene, polypropylene, polystyrene, and polyethylene terephthalate (PET).

Second Embodiment

<Configuration>

The configuration of a water heater in another embodiment of the present invention will be hereinafter described with reference to FIG. 10. As to the configuration other than that of the impeller, the water heater according to the present embodiment is identical to water heater 100 in the first embodiment, and therefore, the configuration of the impeller will be hereinafter described.

Figure 11:
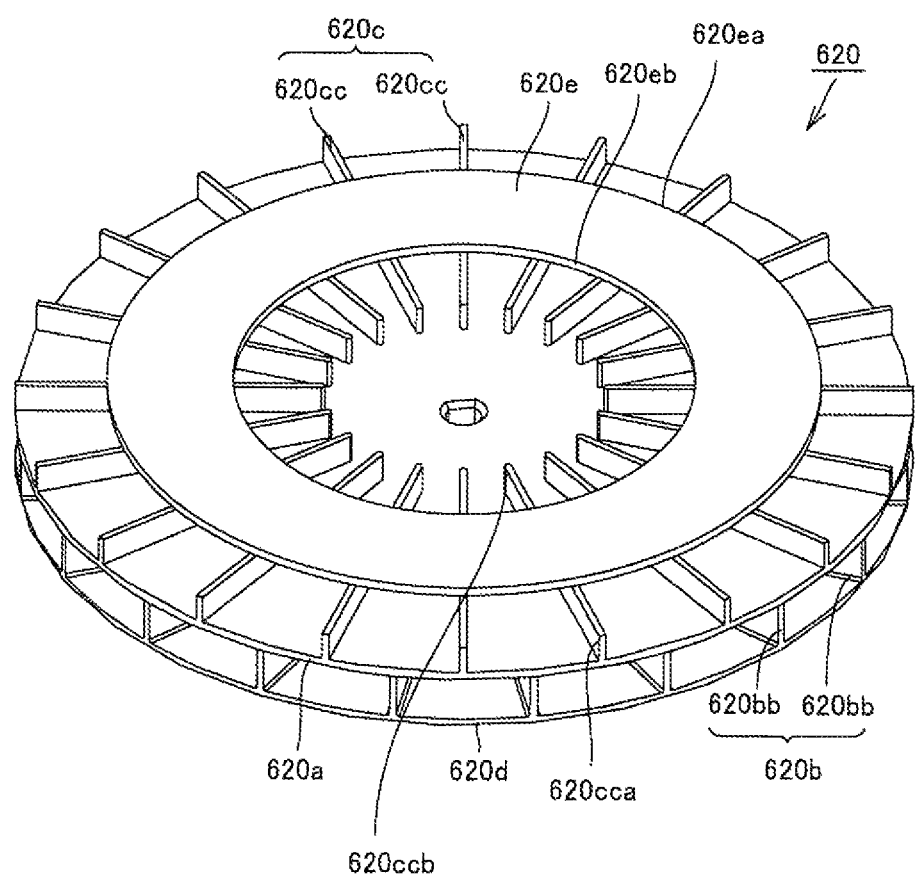
FIG. 11 is a perspective view of an impeller for illustrating the configuration of the impeller included in a water heater in another embodiment of the present invention.
Figure 12:
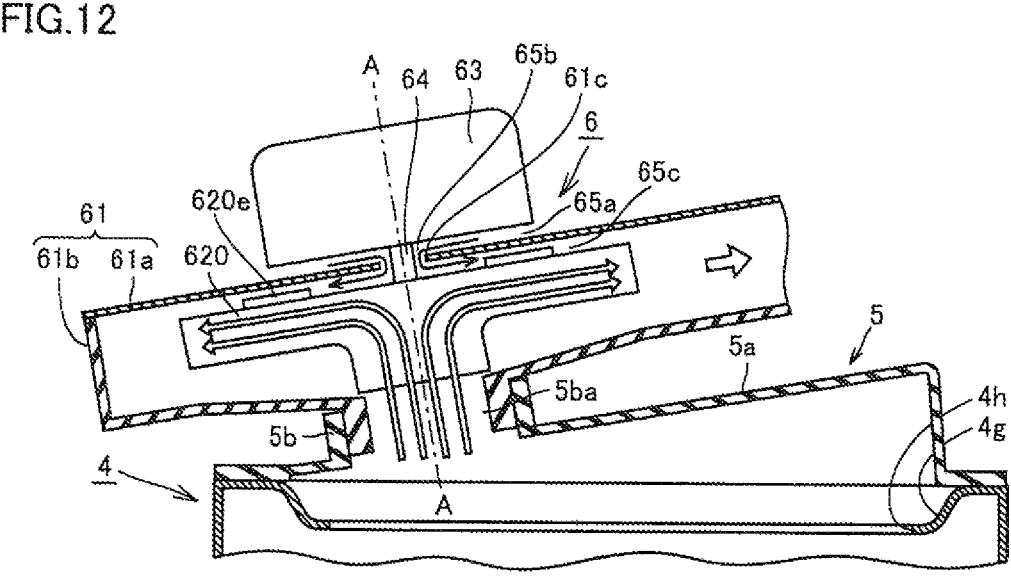
FIG. 12 is a partial cross-sectional view schematically showing a fan and an exhaust box for illustrating the configuration of the fan in the water heater in another embodiment of the present invention and also showing a secondary heat exchanger in an enlarged manner.

Referring to FIGS. 11 and 12, impeller 620 mainly has a disc-shaped main plate 620a, a first blade 620b, a second blade 620c, a first plane side shroud 620d, and a second plane side shroud 620e. Main plate 620a has a first plane 620aa and a second plane 620ab located on the side opposite to this first plane 620aa. First blade 620b is provided on first plane 620aa while second blade 620c is provided on second plane 620ab. First plane side shroud 620d is provided so as to cover the entire first blade 620b, and provided in its center portion with an opening (not shown). Furthermore, second plane side shroud 620e is provided so as to cover a part of second blade 620c.

Main plate 620a, first blade 620b, second blade 620c, and first plane side shroud 620d are similar in configuration to main plate 62a, first blade 62b, second blade 62c, and first plane side shroud 62*d*, respectively, according to the first embodiment. In other words, in the present embodiment, impeller 620 is different from impeller 62 according to the above-described first embodiment only in that it includes second plane side shroud 620*e*.

An outer circumferential end portion 620*cca* of second blade member 620*cc* (second blade 620*c*) is located closer to the outer circumferential side of second plane 620*ab* than an outer circumferential end portion 620*ea* of second plane side shroud 620*e* is. Furthermore, an inner circumferential end portion 620*ccb* of second blade member 620*cc* (second blade 620*c*) is located closer to the inner circumferential side of second plane 620*ab* than an inner circumferential end portion 620*eb* of second plane side shroud 620*e* is. In other words, within fan case 61, second blade members 620*cc* forming second blade 620*c* each include: a center portion that faces back surface wall 61*a* of fan case 61 with another member (second plane side shroud 620*e*) interposed therebetween; and outer circumferential end portion 620*cca* and inner circumferential end portion 620*ccb* that face back surface wall 61*a* without another member interposed therebetween.

<Effects>

The functions and effects of the water heater according to the present embodiment will be hereinafter described.

In the water heater of the present embodiment, the combustion gas within exhaust box 5 is suctioned by the air-blowing capability of first blade 620*b* from the inner circumferential side of first plane 620*aa* of impeller 620 and emitted to the outer circumferential side thereof, the reason of which is the same as in the case of the water heater in the first embodiment.

Furthermore, in the water heater of the present embodiment, by the air-blowing capability of second blade 620*c*, air outside the fan is suctioned through gap 65*b* between rotation shaft 64 and fan case 61 and also through gap 65*b* between second plane 620*ab* and back surface wall 61*a* from the inner circumferential side of second plane 620*ab* of impeller 620 and then emitted to the outer circumferential side thereof, the reason of which will be set forth below.

For example, when the entire second blade 620*c* is covered by second plane side shroud 620*e*, the air-blowing capability of second blade 620*c* can be exerted on the gas flow passage surrounded by second plane 620*ab*, second blade member 620*cc*, and second plane side shroud 620*e*. However, the air-blowing capability of second blade 620*c* is not be exerted on the gap between impeller 620 and back surface wall 61*a*, that is, the gap between second plane side shroud 620*e* and back surface wall 61*a*. Therefore, since no resistance pressure resisting backflow occurs in the gap between impeller 620 and back surface wall 61*a*, backflow of the combustion gas cannot be suppressed.

In contrast, in impeller 620 of the water heater of the present embodiment, outer circumferential end portion 620*cca* of second blade member 620*cc* (second blade 620*c*) is located closer to the outer circumferential side of second plane 620*ab* than an outer circumferential end portion 620*ea* of second plane side shroud 620*e* is. In this case, the blow pressure of the air emitted from the gas flow passage surrounded by second plane 620*ab*, second blade member 620*cc*, and second plane side shroud 620*e* can be applied to the combustion gas that is to flow in through the gap between back surface wall 61*a* and impeller 620.

In other words, when the pressure is generated with which the combustion gas is caused to flow from outer circumferential end portion 620*cca* of second blade member 620*cc* toward inner circumferential end portion 620*ccb* thereof, the air-blowing capability by second blade 620*c* can be exerted upon the combustion gas that is to flow in from outer circumferential end portion 620*cca* if at least outer circumferential end portion 620*cca* and back surface wall 61*a* face each other without another member (second plane side shroud 620*e*) interposed therebetween. Therefore, according to the water heater of the present invention, the fan can be cooled by inflow of air while suppressing backflow of the combustion gas.

Furthermore, in impeller 620 of the water heater in the present embodiment, assuming that the length of second blade member 620*cc* is defined as L, it is preferable that the length of outer circumferential end portion 620*cca* that is not covered by second plane side shroud 620*e* is equal to or more than ¼ of this L. In this case, the blow pressure of the air emitted from the gas flow passage surrounded by second plane 620*ab*, second blade member 620*cc*, and second plane side shroud 620*e* can be sufficiently exerted upon the combustion gas that is to flow in through the gap between back surface wall 61*a* and impeller 620, so that backflow can be effectively suppressed. Furthermore, the above-described length is more preferably equal to or more than ⅓ of L, and further more preferably equal to or more than ½ of L.

In impeller 620 of the water heater in the present embodiment, inner circumferential end portion 620*ccb* of second blade member 620*cc* is located closer to the inner circumferential side of second plane 620*ab* than inner circumferential end portion 620*eb* of second plane side shroud 620*e* is, but the configuration on the inner circumferential end portion 620*eb* side is not limited thereto. For example, the inner circumferential end side of second blade member 620*cc* may be entirely covered by second plane side shroud 620*e*.

In the water heater of the present embodiment, since the effect achieved by another embodiment of impeller 620 (for example, the effect achieved by having first plane side shroud 620*d*, the effect achieved by first blade member 620*bb* and second blade member 620*cc* having the same length, and the like) is the same as that achieved in the first embodiment, description thereof will not be repeated.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A water heater comprising: a burner generating combustion gas; a heat exchanger heating water flowing through inside by heat exchange with combustion gas; and a fan suctioning combustion gas having passed through said heat exchanger and emitting combustion gas to outside of the water heater, said fan being located downstream of said heat exchanger in a flow of said combustion gas, said fan including a fan case having a back surface wall, an impeller housed within said fan case and having a main plate disposed on one side of said back surface wall of said fan case, a first blade provided on a first plane of said main plate on a side opposite to said back surface wall, and a second blade provided on a second plane of said main plate on a side close to said back surface wall, a drive source disposed on another side of said back surface wall and rotating said impeller, and a rotation shaft coupling said impeller and said drive source through a through hole provided in said back surface wall, a gap through which air outside said fan case is suctioned into said fan case being provided between said rotation shaft penetrating said through hole and said back surface wall, said second blade facing said back surface wall without another member interposed therebetween throughout a range from an inner circumferential side to an outer circumferential side of said second plane, a distance between said back surface wall and an end of said second blade closest to said back surface wall is equal to or less than a height of said second blade, and said second blade is configured to suck air other than combustion gas from the outside of said fan case to the inside of said fan case through said gap so that said combustion gas does not flow to the outside of said fan case through said gap.

2. The water heater according to claim 1, wherein
said impeller has a first plane side shroud covering said first blade.

3. The water heater according to claim 1, wherein
said first blade includes a plurality of first blade members each extending from an inner circumferential side to an outer circumferential side of said first plane and formed so as to protrude from said first plane,
said second blade includes a plurality of second blade members each extending from the inner circumferential side to the outer circumferential side of said second plane and formed so as to protrude from said second plane, and
said second blade members each extending from the inner circumferential side to the outer circumferential side of said second plane are identical in length to said first blade members each extending from the inner circumferential side to the outer circumferential side of said first plane.

4. The water heater according to claim 2, wherein
said first blade includes a plurality of first blade members each extending from an inner circumferential side to an outer circumferential side of said first plane and formed so as to protrude from said first plane,
said second blade includes a plurality of second blade members each extending from the inner circumferential side to the outer circumferential side of said second plane and formed so as to protrude from said second plane, and
said second blade members each extending from the inner circumferential side to the outer circumferential side of said second plane are identical in length to said first blade members each extending from the inner circumferential side to the outer circumferential side of said first plane.

5. The water heater according to claim 3, wherein
a height of each said second blade member in a direction in which said second blade member protrudes from said second plane is equal to or less than a height of each said first blade member in a direction in which said first blade member protrudes from said first plane.

6. The water heater according to claim 4, wherein
a height of each said second blade member in a direction in which said second blade member protrudes from said second plane is equal to or less than a height of each said first blade member in a direction in which said first blade member protrudes from said first plane.

7. The water heater according to claim 3, wherein
when said main plate is seen from an axial direction of said rotation shaft, each said second blade member is located between two said first blade members adjacent to each other.

8. The water heater according to claim 3, wherein
said first blade includes a linearly protruding region that is linearly increased in height from the outer circumferential side to the inner circumferential side, and a curvedly protruding region that is curvedly increased in height from the outer circumferential side to the inner circumferential side, said height extending in a direction in which each said first blade member protrudes from said first plane, and
said curvedly protruding region is located closer to the inner circumferential side of said first plane than said linearly protruding region is.

9. The water heater according to claim 3, wherein
when said first plane is seen from an axial direction of said rotation shaft, each said first blade member includes a linearly extending region extending linearly from the outer circumferential side to the inner circumferential side of said first plane, and a curvedly extending region extending curvedly from the outer circumferential side to the inner circumferential side of said first plane, and
said curvedly extending region is located closer to the inner circumferential side of said first plane than said linearly extending region is.

10. The water heater according to claim 1, wherein
said water heater is a water heater of a latent heat recovery type capable of heating water by recovering latent heat of combustion gas, and
said impeller is made of a resin material having acid resistance.

11. A water heater comprising: a burner generating combustion gas; a heat exchanger heating water flowing through inside by heat exchange with combustion gas; and a fan suctioning combustion gas having passed through said heat exchanger and emitting combustion gas to outside of the water heater, said fan being located downstream of said heat exchanger in a flow of said combustion gas, said fan including a fan case having a back surface wall, an impeller housed within said fan case and having a main plate disposed on one side of said back surface wall of said fan case, a first blade provided on a first plane of said main plate on a side opposite to said back surface wall, a second blade provided on a second plane of said main plate on a side close to said back surface wall, and a second plane side shroud covering at least a part of said second blade, a drive source disposed on another side of said back surface wall and rotating said impeller, and a rotation shaft coupling said impeller and said drive source through a through hole provided in said back surface wall, a gap through which air outside said fan case is suctioned into said fan case being provided between said rotation shaft penetrating said through hole and said back surface wall, an outer circumferential end of said second blade being located closer to the outer circumferential side of said second plane than an outer circumferential end of said second plane side shroud is, and said second blade is configured to suck air other than combustion gas from the outside of said fan case to the inside of said fan case through said gap so that said combustion gas does not flow to the outside of said fan case through said gap.

12. The water heater according to claim 11, wherein
said impeller has a first plane side shroud covering said first blade.

13. The water heater according to claim 11, wherein
said first blade includes a plurality of first blade members each extending from an inner circumferential side to an outer circumferential side of said first plane and formed so as to protrude from said first plane,
said second blade includes a plurality of second blade members each extending from an inner circumferential side to an outer circumferential side of said second plane and formed so as to protrude from said second plane, and said second blade members each extending from the inner circumferential side to the outer circumferential side of said second plane are identical in length to said first blade members each extending from the inner circumferential side to the outer circumferential side of said first plane.

14. The water heater according to claim 12, wherein
said first blade includes a plurality of first blade members each extending from an inner circumferential side to an outer circumferential side of said first plane and formed so as to protrude from said first plane,
said second blade includes a plurality of second blade members each extending from an inner circumferential side to an outer circumferential side of said second plane and formed so as to protrude from said second plane, and
said second blade members each extending from the inner circumferential side to the outer circumferential side of said second plane are identical in length to said first blade members each extending from the inner circumferential side to the outer circumferential side of said first plane.

15. The water heater according to claim 13, wherein
a height of each said second blade member in a direction in which said second blade member protrudes from said second plane is equal to or less than a height of each said first blade member in a direction in which said first blade member protrudes from said first plane.

16. The water heater according to claim 14, wherein
a height of each said second blade member in a direction in which said second blade member protrudes from said second plane is equal to or less than a height of each said first blade member in a direction in which said first blade member protrudes from said first plane.

17. The water heater according to claim 13, wherein
said main plate is seen from an axial direction of said rotation shaft, each said second blade member is located between two said first blade members adjacent to each other.

18. The water heater according to claim 13, wherein
said first blade includes a linearly protruding region that is linearly increased in height from the outer circumferential side to the inner circumferential side, and a curvedly protruding region that is curvedly increased in height from the outer circumferential side to the inner circumferential side, said height extending in a direction in which each said first blade member protrudes from said first plane, and
said curvedly protruding region is located closer to the inner circumferential side of said first plane than said linearly protruding region is.

19. The water heater according to claim 13, wherein
when said first plane is seen from an axial direction of said rotation shaft, each said first blade member includes a linearly extending region extending linearly from the outer circumferential side to the inner circumferential side of said first plane, and a curvedly extending region extending curvedly from the outer circumferential side to the inner circumferential side of said first plane, and
said curvedly extending region is located closer to the inner circumferential side of said first plane than said linearly extending region is.

20. The water heater according to claim 11, wherein
said water heater is a water heater of a latent heat recovery type capable of heating water by recovering latent heat of combustion gas, and
said impeller is made of a resin material having acid resistance.

\* \* \* \* \*